United States Patent [19]

Elger

[11] Patent Number: 4,717,913

[45] Date of Patent: Jan. 5, 1988

[54] DATA TELEMETRY SYSTEM USING DIFFUSED INFRARED LIGHT

[75] Inventor: Rodney R. Elger, Brookfield, Wis.

[73] Assignee: Johnson Service Company, Milwaukee, Wis.

[21] Appl. No.: 770,680

[22] Filed: Aug. 29, 1985

[51] Int. Cl.[4] .......................... H04Q 9/00; G02F 1/00; H04B 9/00
[52] U.S. Cl. .................... 340/825.54; 455/606; 455/613; 455/601; 340/825.72
[58] Field of Search ............ 340/825.54, 825.72; 455/603, 606, 607, 613, 605, 617, 619, 604

[56] References Cited

U.S. PATENT DOCUMENTS

| | | |
|---|---|---|
| 4,119,948 | 10/1978 | Ward et al. . |
| 4,160,246 | 7/1979 | Martin et al. . |
| 4,398,172 | 8/1983 | Carroll et al. ................... 455/604 |
| 4,495,655 | 1/1985 | Benson et al. ................... 455/607 |
| 4,551,710 | 11/1985 | Troup et al. ................... 455/607 |

FOREIGN PATENT DOCUMENTS

| | | | |
|---|---|---|---|
| 2823931 | 12/1979 | Fed. Rep. of Germany ....... | 455/606 |
| 2140237 | 11/1984 | United Kingdom ................ | 455/613 |

OTHER PUBLICATIONS

"Digital Control with Infrared Light", Machine Design, Nov. 6, 1980, pp. 73–78.

*Linear I.C. Handbook*, by Plessey Semiconductors of Irvine, Calif., May 1982, pp. 85–87, 89–92 and 359–362.
*Optodata Data Sheet, 5010 Series*", by Scientific Radiation Corporation of Mountain View, Calif., 1980.

*Primary Examiner*—Ulysses Weldon
*Assistant Examiner*—Ralph E. Smith
*Attorney, Agent, or Firm*—Alexander M. Gerasimow; Larry L. Shupe

[57] ABSTRACT

A data telemetry system for process control includes a point transponder adapted to receive digitally coded infrared interrogation signals. The transponder includes a first group of positive, intrinsic, negative (PIN) diodes disposed thereon for omnidirectionally detecting interrogation signals and a second group of infrared emitting diodes for generating digitally coded signals responsive to the interrogation signals. The first group and the second group of diodes define a first array of diode nodes, each node including at least one diode from each group. A transceiver includes a generally hemispherical, omnidirectional transmitting and receiving member having a third group of infrared emitting diodes disposed thereon for generating the interrogation signals and a fourth group of PIN diodes for receiving the responsive signals from the transponder. The third and fourth groups define a second array of diode nodes, each node including at least one diode from each other. The interrogation signals received at the transponder and responsive signals received at the transceiver are formed at least in part of diffuse infrared light.

2 Claims, 10 Drawing Figures

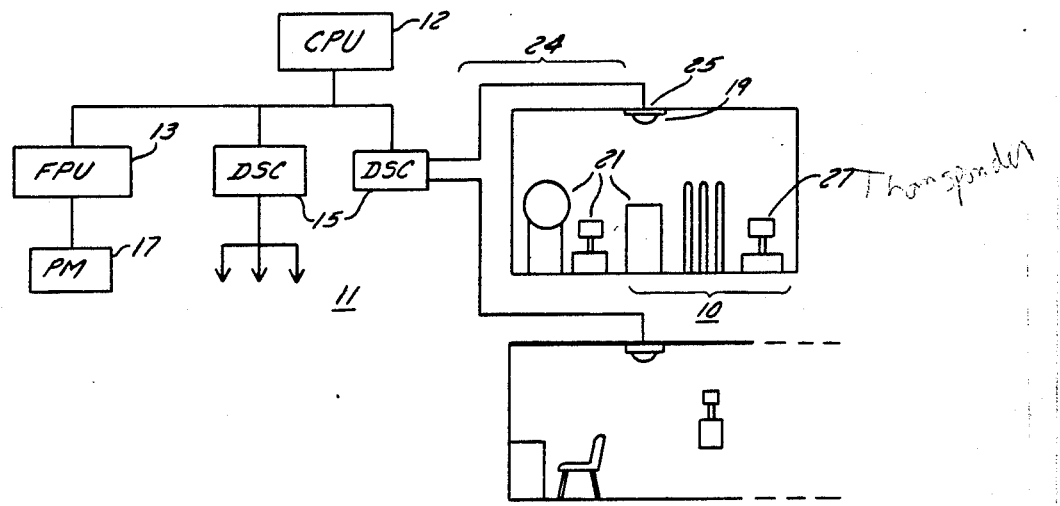
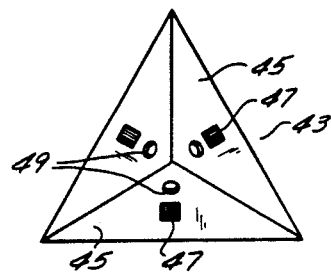
FIG. 2C
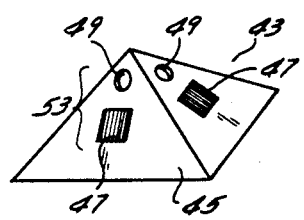
FIG. 2B
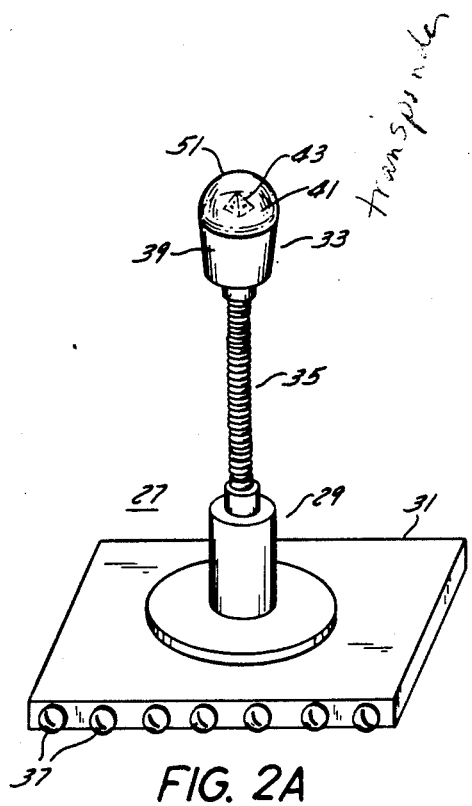
FIG. 2A
FIG. 1

DATA TELEMETRY SYSTEM USING DIFFUSED INFRARED LIGHT

This invention relates generally to data telemetry systems and more particularly, to such a system which employs an omnidirectional infrared light radiating and receiving transceiver and transponder, the latter being locatable at a plurality of points in a process control system for control thereof. The inventive apparatus is particularly useful for applications in heating, ventilating and air conditioning (HVAC) equipment rooms.

Infrared communication systems using either diffuse or line-of-sight techniques are generally known and several of such systems are described in an Information Disclosure Statement attached hereto. While such systems are generally known, they have failed to appreciate the manner in which a transceiver and transponder may be specially configured to effect infrared data link communications using diffuse light techniques.

SUMMARY OF THE INVENTION

In general, a data telemetry system for process control includes a point transponder adapted to receive digitally coded infrared interrogation signals. The transponder includes a first group of positive, intrinsic, negative (PIN) diodes disposed thereon for omnidirectionally detecting interrogation signals and a second group of infrared emitting diodes for generating digitally coded signals responsive to the interrogation signals. The first group and the second group of diodes define a first array of diode nodes, each node including at least one diode from each group.

A transceiver includes a generally hemispherical, omnidirectional transmitting and receiving member having a third group of infrared emitting diodes disposed thereon for generating the interrogation signals and a fourth group of PIN diodes for receiving the responsive signals from the transponder. The third and fourth groups define a second array of diode nodes, each node including at least one diode from each group. The interrogation signals received at the transponder and responsive signals received at the transceiver are formed at least in part of diffuse infrared light.

It is an object of the present invention to provide an infrared data telemetry system useful for process control.

Yet another object of the present invention is to provide a data telemetry system which employs a transceiver having an omnidirectional member.

Another object of the present invention is to provide a data telemetry system employing a transponder having a group of PIN diodes thereon for omnidirectionally detecting diffuse infrared interrogation signals.

Still another object of the present invention is to provide a data telemetry system employing a transceiver and a transponder, each having an array of diode nodes, each node including diodes of disparate types. These and other objects of the present invention will become more apparent from the detailed description thereof taken in connection with the accompanying drawing.

DESCRIPTION OF THE DRAWING

FIG. 1 is a simplified pictorial diagram of a process control system employing, in part, diffuse infrared data telemetry techniques;

FIG. 2A is a pictorial elevation view of a point transponder comprising a portion of the inventive system;

FIG. 2B is an enlarged, side elevation view of the element portion of the transponder of FIG. 2A;

FIG. 2C is an enlarged top plan view of the element of FIG. 2B;

DETAILED DESCRIPTION OF THE PREFERRED EMBODIMENT

Figure 3:
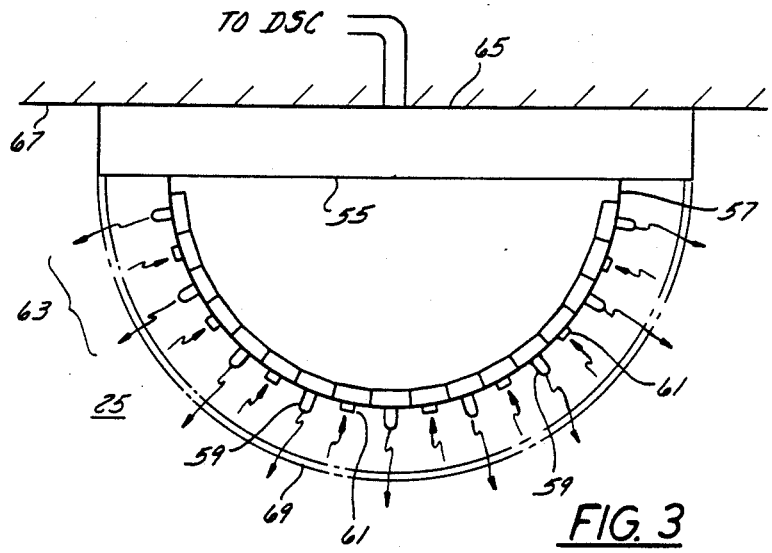
FIG. 3 is a cross-sectional, side elevation view of the satellite portion of the system transceiver with parts shown in cross-section and other parts shown in full representation.

Referring first to FIG. 1, the inventive system 10 is shown in connection with an exemplary process control system 11 for controlling the HVAC equipment in a large office building. The system 11 is shown to include a central processing unit 12 (CPU) wired to a plurality of lower level controllers or local control units. These controllers may include one or more field processing units 13 (FPU) and/or one or more digital single zone controllers 15 (DSC) such as the DSC 8500 controller as manufactured by Johnson Controls, Inc. of Milwaukee, Wis. The DSC 15 may conveniently incorporate portions of the circuitry of the inventive system 10. These FPU and DSC controllers 13, 15 may, in turn, be wired to yet lower level point modules 17 (PM) for control of specific apparatus or parameters such as valve and damper positions, space temperature and the like. In the example depicted by FIG. 1, the building may include a large room 19 having disposed therein one or more items of equipment 21 such as boilers, humidification units, chillers and the like. The building may also include a plurality of rooms intended for human occupancy and with respect to which, certain spatial parameters such as temperature are to be controlled. In the exemplary system 11, it is desirable to monitor and control this equipment 21 for regulating the temperature and humidity of offices or for energy management and conservation. By using the data telemetry system 10 of the invention, it will be possible to eliminate wiring otherwise required to be connected between the DSC 15 and the equipment 21 and significant installation savings will thereby result.

The data telemetry system 10 includes a satellite 25 wired to the DSC 15 and located in a manner such to enable infrared data link communications with one or more of the point transponders 27 disposed within the room 19. Frequently, each such transponder 27 will be dedicated to the monitoring and control of a single item of equipment 21, e.g., a chiller or a boiler.

Since data telemetry communications between the satellite 25 and the transponders 27 will primarily be by diffuse infrared light, it may be necessary to experimentally position those units to optimize communications. The configuration of the satellite 25, as set forth in detail below, is selected to take advantage of the infrared (IR) light reflecting qualities of commonly used building materials such as wood, plaster, textiles and painted walls. It is reasonable to anticipate that these materials will reflect 40-90% of all IR light impinging thereon so that the radiation from the satellite 25 will be diffusely scattered, essentially flooding the entire room 19 with IR light at a detectable power level.

Referring next to FIG. 2A, a point transponder 27 is shown to include a body member 29 which is secured to a platform 31 and supports a head member 33 in a position such that the latter may receive interrogation signals emanating from the satellite 25 and may also transmit signals responsive to those interrogation signals. The head member 33 is preferably supported by means which will permit its attitude to be adjusted relative to the base member and an adjustable goose neck 35 may be used for the purpose. The body member 29, platform 31 and head member 33 may each include certain electrical circuitry as described hereinafter and this circuitry may be connected to external points using screw terminals 37 and wiring (not shown) embedded in the platform 31.

Referring additionally to FIG. 2B, the head member 33 includes a generally cylindrical portion 39 including a planar upper surface 41 highly reflective of IR light and having affixed thereto an element 43 for supporting diodes for the reception and transmission of IR light. The element 43 has a plurality of generally planar, reflective surfaces 45 which are angularly juxtaposed one with respect to the other for the transmission and reception of diffuse IR light. While these surfaces 45 may define any one of several geometric shapes, a quadrihedron for example, the illustrated tetrahedron is preferred. Each surface 45 includes a PIN diode 47 disposed thereon for omnidirectionally detecting interrogation signals and an IR emitting diode 49 disposed thereon for generating digitally coded signals as commanded by the circuitry and in response to interrogation signals. The PIN diodes 47 and the IR emitting diodes 49 define a first group and a second group of diodes, respectively. If it is anticipated that airborne dust or other contaminants may be present in the room, an IR light translucent, readily cleaned dome 51 may be attached to the portion 39 for protecting the element 43. Since fluorescent lamps and sunlight both include possibly interfering light components having wave lengths in the ultraviolet and visible light spectrums, the dome 51 may be configured of known materials to act as an optical band pass filter, admitting and transmitting only light in the near infrared spectrum. As illustrated in FIGS. 2B and 2C, the first group and the second group of diodes 47, 49 define a first array of diode nodes 53, each node 53 including at least one diode 47 of the first group and at least one diode 49 of the second group. When configured in the aforedescribed manner, the element 43 will permit the reception of either line-of-sight or diffuse light emanating from the satellite 25 and will also permit the transmission of such light to be received at the satellite 25 in either or both of those same modes.

Referring next to FIG. 3, the satellite 25 is shown to include a face member 55 having a generally hemispherically shaped reflective member 57 attached thereto. The reflective member 57 may be formed of a rigid material having an exterior surface selected, either by natural characteristic or by suitable coating, to be highly reflective of IR light. The reflective member 57 has a plurality of IR emitting diodes 59 disposed thereon with their axes oriented in a manner to flood the surrounding room 19 with IR light. The diodes 59 generate interrogation signals as commanded by the exemplary DSC 15 coacting with the transceiver circuit and are preferably regularly disposed upon the reflective member 57 in a spaced apart relationship one to the other to define a third group. Additionally, the reflective member 57 has disposed thereon a plurality of PIN diodes 61 for receiving responsive signals emanating from the transponder 27. These PIN diodes 61 define a fourth diode group, the third and fourth groups defining a second array of diode nodes 63. Preferably, each node 63 includes at least one IR emitting diode 59 of the third group and at least one PIN diode 61 of the fourth group. The face and reflective members 55, 57 will preferably incorporate certain portions of the electrical circuitry as described hereinafter, those portions being connected to other portions by wiring as required. If the face member 55 is configured to have a planar upper surface 65, it will thereby be readily suitable for mounting upon the ceiling 67 of the room 19 or upon a wall. When configured in the manner shown and described above, the satellite 25 will radiate interrogation signals in a generally hemispherical pattern bounded by the mounting surface. The reflective member 57 may be covered by a dome 69 of the same general type and for the purposes described with respect to the transponder dome 51.

Figure 4:
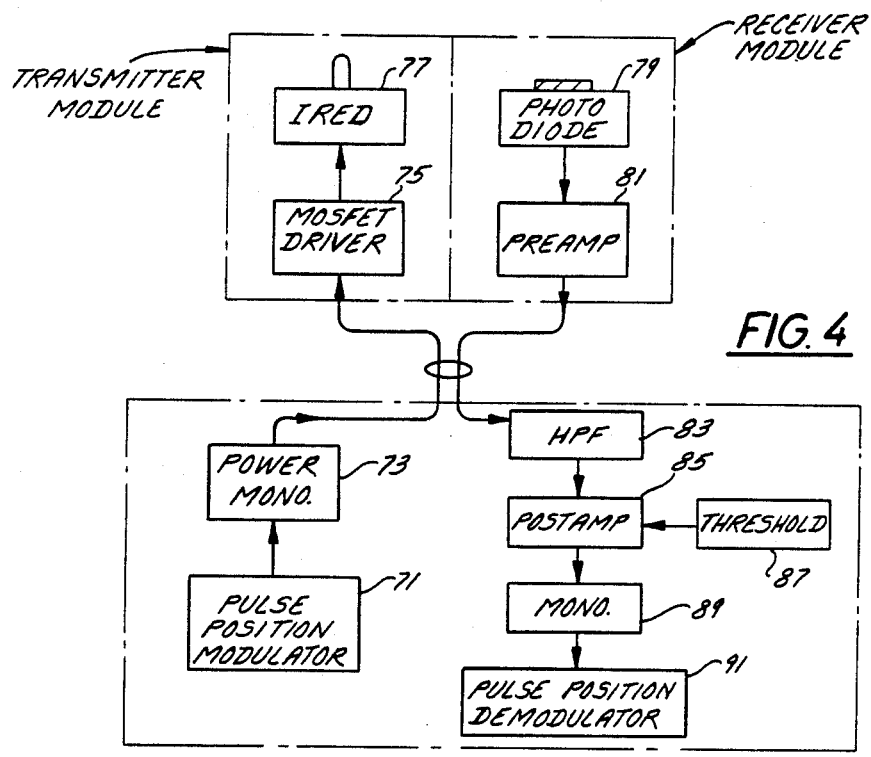
FIG. 4 is an electrical circuit, in simplified block diagram form, of the system transceiver or transponder.

Referring next to FIG. 4, a transceiver 24 will be defined to include the satellite 25 together with the circuitry of FIG. 4 defined in greater detail hereinafter and wherever such circuitry is physically located while a transponder 27 will be defined as set forth above together with the circuitry of FIG. 4. The electrical circuitry suitable for use with the satellite 25 and with the transponder 25 is shown to include a pulse position modulator 71, a nonretriggerable monostable multivibrator 73, a driver 75 and an IR emitting diode 77 and it is to be appreciated that the diode generally denoted as 77 may be a diode 49 of the transponder 27 or a diode 59 of the satellite 25. If it is desired to configure the transponder 27 as a battery powered device, a highly desirable feature for a transponder 27 which avoids the installation of power wiring, the driver 75 will be embodied using high gain MOSFET transistors. Transistors of this type require minimal gate drive power and their use helps avoid additional electrical circuitry which would otherwise be required to simultaneously pulse all IR emitting diodes using bipolar means. The dedication of a MOSFET driver to each IR emitting diode readily permits modular design and minimizes the output loop resistance and inductance. Additionally, MOSFETs may be switched much more rapidly than bipolar devices and therefore the energy dissipated during repetitive, high peak current switching is much lower. Additionally, the required standby power is minimal and the battery life will thereby be extended. A suitable IR emitting diode is preferably selected to be of the GaAs or GaAlAs type as, for example, the type CQX 19 which may be pulsed at currents up to 10 amperes and are available from AEG-TELEFUNKEN. The electrical circuit also includes a plurality of PIN photodiodes 79 coupled to a preamplifier 81, a high pass filter 83, a postamplifier 85 preferably equipped with threshold sensitivity adjustment 87, a multivibrator 89 of the aforedescribed type and a pulse position demodulator 91 and it is to be appreciated that the diode generally denoted as 79 may be a diode 49 of the transponder 27 or a diode 59 of the satellite 25.

A preferred PIN diode 79 will be embodied as a high speed, low capacitance, low leakage silicon device of planar construction. One such photodiode is the Ferranti BPW 41 and has a silicon nitride layer which acts as a passivating and antireflection coating. The active area of the exemplary diode is 7.5 mm² and has a plastic housing containing a dye which is highly transmittive of light in the near infrared spectrum, i.e., 700 nm–1100 nm, but which is absorbent of visible light in the 400 nm to 700 nm range. The insensitivity of this diode to visible light and its excellent sensitivity to infrared radiation are aided by the silicon spectral response which is low in the blue-green light wavelength spectrums and high in the infrared wavelength spectrums. Planar construction results in substantially reduced reverse leakage, an important consideration in applications involving signals of low power levels. Further, the capacitance per unit area is lower than that of a conventional PIN diode, thus permitting the diode to be pulsed at higher rates.

In order to reduce the physical size of that portion of the satellite 25 comprising the reflective member 57 and the face member 55 and that portion of the transponder 27 comprising the head member 33, it is preferable that only the diodes 77, 79, the driver 75 and the preamplifier 81 be embodied within the head member 33 or within the satellite face member 55. The balance of the transponder circuitry may be embodied in, for example, the body member 29 and the platform 31 and in the case of the transceiver 24, in those portions thereof which are physically disassociated from the reflective member 57.

Figure 5A:
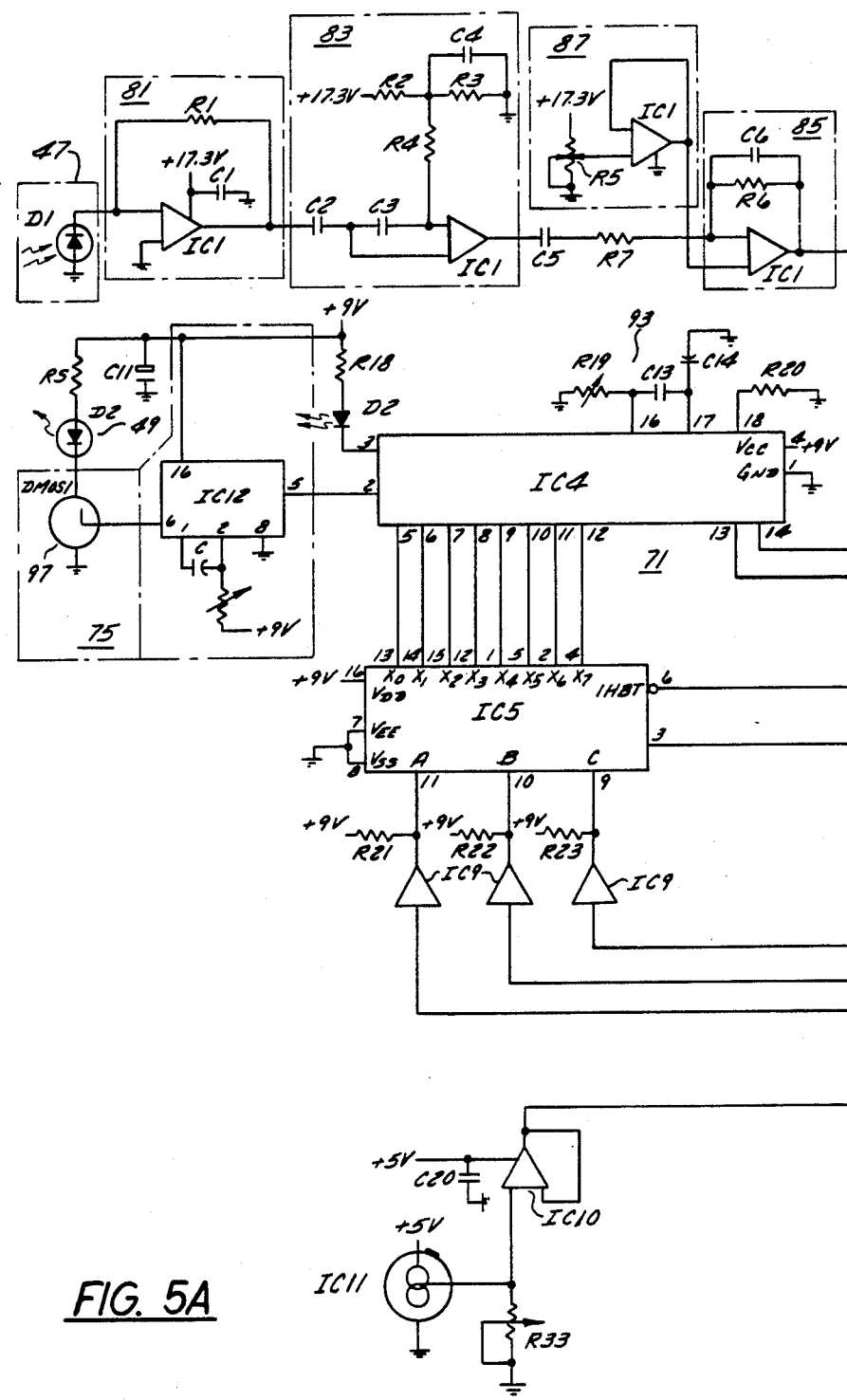
FIGS. 5A and 5B, taken together along the indicated match lines, comprise a detailed electrical circuit diagram of a portion of the circuit of FIG. 4.
Figure 5B:
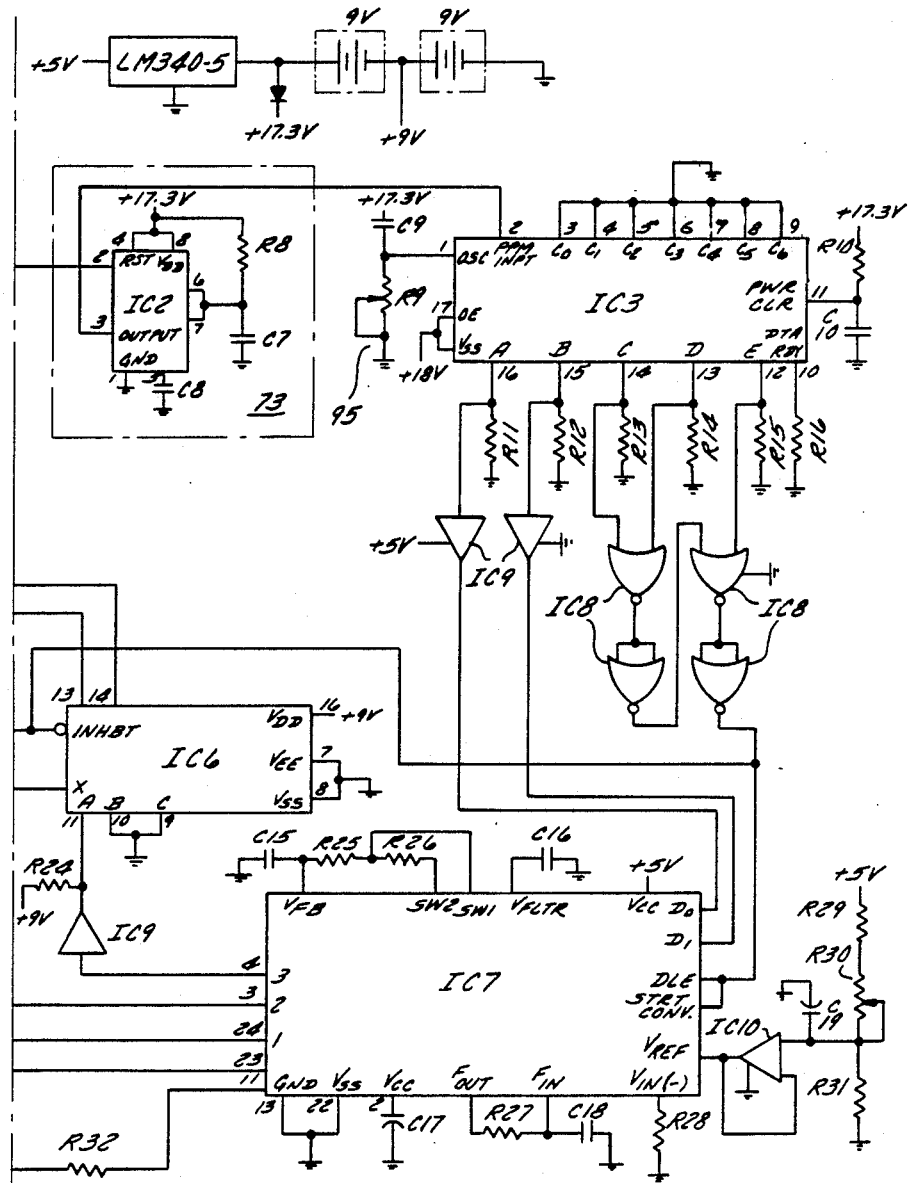

Referring next to FIGS. 1, 2A–2C, 6A and 6B and particularly to FIGS. 5A and 5B, an exemplary transponder 27 is embodied to sense the temperature within a space or room 19 and upon reception at one or more PIN diodes 47 of diffuse or direct IR light emanating from the satellite 25 as an interrogation signal, to generate a pulse coded response signal from the IR emitting diodes 49 which is representative of temperature. These signals may be processed by the DSC 15, by the FPU 13 and/or by the CPU 12, resulting in adjustments to the settings of the equipment 21 or of other equipment (not shown) and located elsewhere within the building. The transponder 27 electrical circuitry includes a pulse position modulator 71, a power monostable multivibrator 73, a MOSFET driver 75 and an array of IR emitting diodes 77. The modulator 71 includes a plurality of 18 pin bipolar, remote control, pulse transmitting monolithic circuits for use with the ML920 family of demodulators/receivers. Each monolithic circuit is embodied as a 4×8 single-pole switch matrix of 32 switches used to encode the transmitter which then may give either a modulated carrier frequency from an on-chip oscillator or a DC pulse output when arranged as shown. A first resistor-capacitor (RC) circuit 93 selects carrier options and defines frequency while a second RC circuit 95 defines the modulation rate. Continuous or pulsed visual indication can be driven directly from pin 2 of the circuit IC4. The carrier oscillator can be disabled for pulsed operation of infra-red, and more than one set of 32 commands can be used by changing the modulation rate and carrier frequency. The multivibrator 73 is used to interface the modulator 71 with the MOSFET driver 75, is connected in the non-retriggerable mode and has a variable pulse width referenced from the application of the first trigger pulse.

The driver 75 preferably utilizes advanced switches rather than bipolar switches for reduction in the number of discrete components and their associated assembly costs. Since the illustrated high gain DMOS switches, of which switch 97 is exemplary, require minimal drive power, simultaneous gating of all switches 97 and their associated diodes 77 is greatly simplified. Dedication of a DMOS switch 97 to each of the diodes 77 permits custom, modular, array design and minimizes output loop resistance and inductance. Since DMOS devices may be switched much more rapidly than bipolar devices, the energy dissipated during repetitive, high-peak current switching is much lower. Additionally, their standby power is minimal and battery life is thereby extended. Further, DMOS switches offer distinct reliability advantages as they are relatively free from thermally induced secondary breakdown.

Figure 6A:
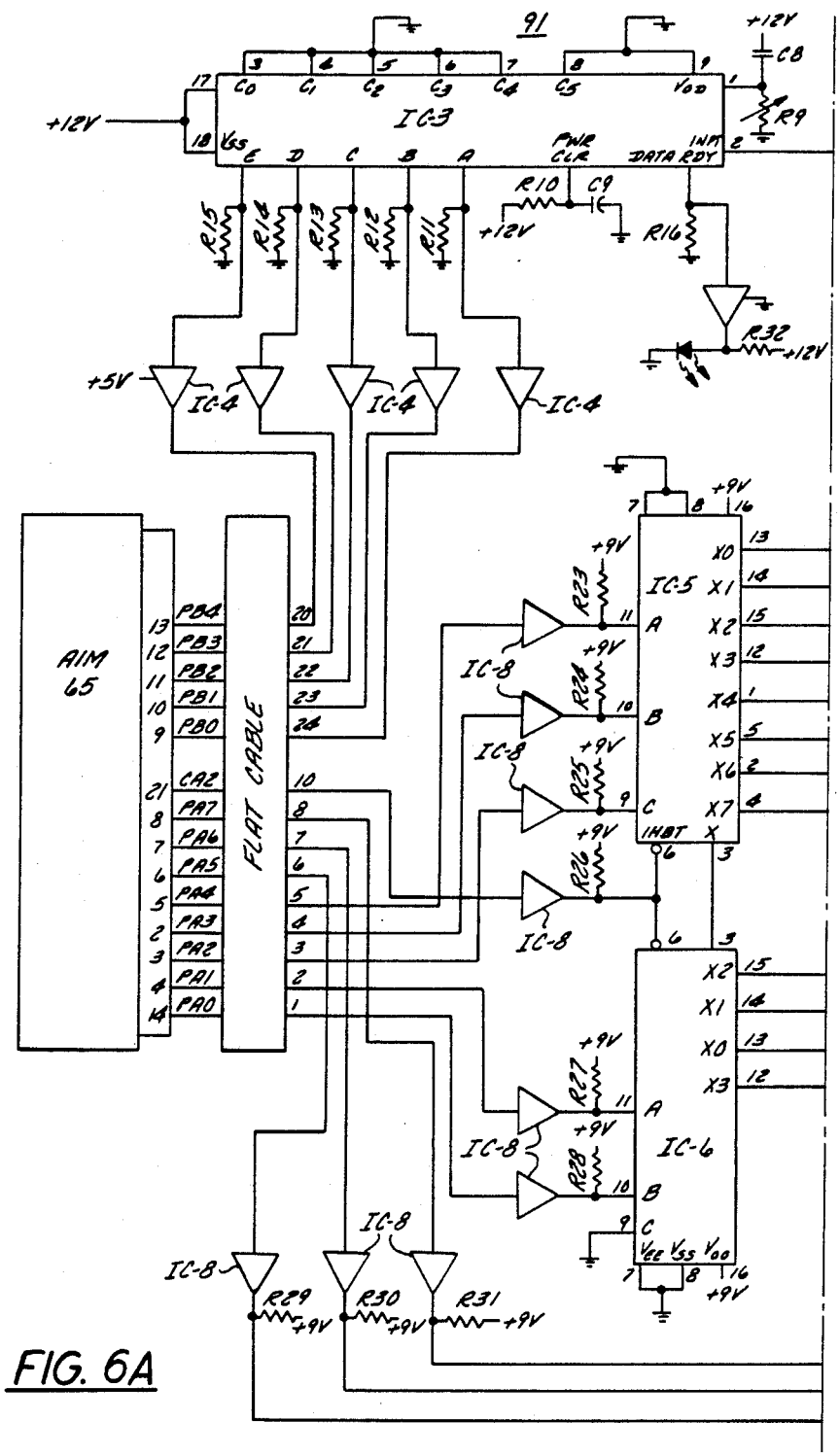
FIGS. 6A and 6B, taken together along the indicated match lines, comprise a detailed electrical circuit diagram of another portion of the circuit of FIG. 4.
Figure 6B:
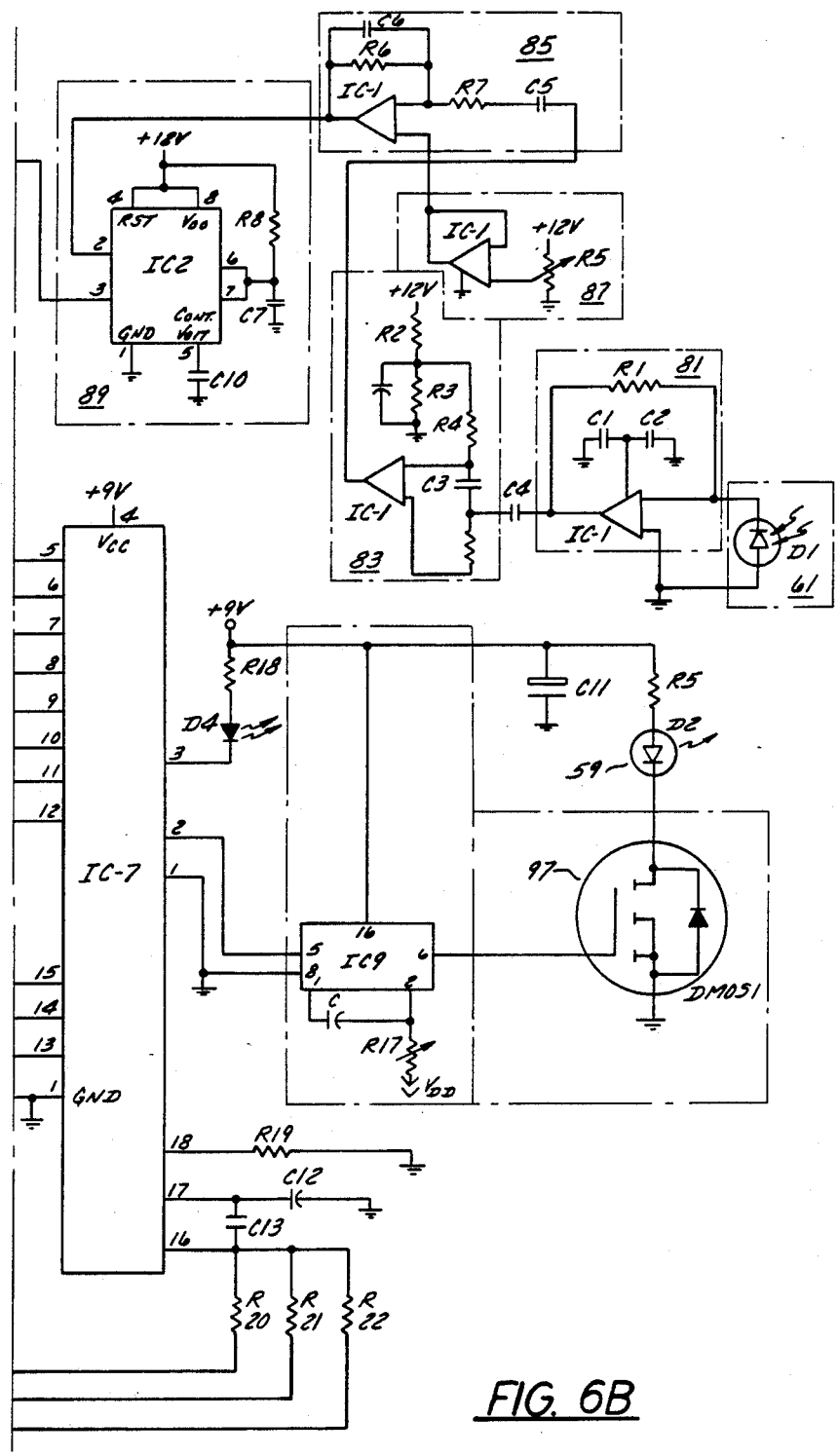

Referring next to FIGS. 1, 3, 5A and 5B and especially to FIGS. 6A and 6B, the electrical circuitry of the transponder 27 also includes, in addition to the aforementioned plurality of detecting diodes 79, a preamplifier 81, a high pass filter (HPF) 83, a post amplifier 85, a threshold control 87, a monostable multivibrator 89 and a pulse position demodulator (PPD) 91 or receiver. More particularly, the preamplifier 81 conditions the signal for transmission through the goose neck 35 to the circuitry disposed in the base member 29 and/or platform 31. The preamplifier 81 is preferably embodied as a high gain transimpedance amplifier connected directly to the detecting diodes 79 in the short circuit mode. The filter 83 is preferably embodied as a two pole Dutterworth type to attenuate low-frequency noise and the preferred corner frequency is approximately 4.74 KHz. The post amplifier 85 amplifies the filtered signal to a level compatible to the input of the multivibrator 85 while the threshold control 87 is to permit the selection of a threshold voltage for the post amplifier which is slightly above the normal noise level.

The multivibrator 85 is constructed and arranged to shape the signal to be compatible with the input characteristics of the PPD 91, the latter being an MOS/LSI integrated circuit for use as a receiver of remote control signals generated by the transmitter circuit. The embodied PPD 91 has five digital outputs, the codes of which may be programmed by six control lines. It includes a handshake interface to provide communication with microprocessors and computers. In a case where analog outputs are desired, another version of this circuit, the ML920, may be employed and has three digital to analog converters on the outputs. It will be apparent from the foregoing that the circuitry of FIGS. 4, 5A and 5B and 6A and 6B has been described with respect to the transponder 27 and is equally applicable to the construction of the transceiver 24.

The following components have been found useful in the circuitry of the FIGURES where resistance is in ohms, capacitance is in microfarads unless otherwise indicated.

| FIGS. 5A and 5B | | | |
|---|---|---|---|
| IC-1 | TL 094 | IC-2 | ICM 7555 |
| IC-3 | ML 924 | IC-4 | SL 490 |
| IC-5,6 | CD 4051 | IC-7 | ADC 3511 CC |
| IC-8 | CD 4001 | IC-9 | 4050 |
| IC-10 | LM 358 | IC-11 | AD 590 KH |
| IC-12 | 4098B | C1 | 0.01 |
| C2,3 | 0.001, +/− 1% | C4 | 10 |
| C5 | 0.001, +/− 1% | C6,7 | 20 pF |
| C8 | 0.01 | C9 | 22 |
| C10 | 4.7 | C11 | 33 |
| C13 | 0.1 | C14 | 4.7 |
| C15,16 | 0.47 | C17 | 10 |
| C18 | 250 pF | C19 | 10 |

-continued

FIGS. 5A and 5B

| | | | |
|---|---|---|---|
| C20 | 0.1 | DMOS 1 | Supertex VN1206N5 |
| D1 | BPW 41D | D2 | CQX-19 |
| R1 | 5.1 M | R2,3 | 10K |
| R4 | 47K | R5 | 1K, POT. CERMET |
| R6 | 5.1 M | R7 | 10K |
| R8 | 24K | R9 | 500K, POT. CERMET |
| R10-16 | 56K | R17 | 1K |
| R18 | 450 | R19 | 250K, POT. CERMET |
| R20-24 | 2K | R25 | 100K |
| R26 | 200 | R27 | 7.5K |
| R28 | 51K | R29 | 1.5K, +/− 1% |
| R30 | 50, POT. CERMET | R31 | 1.0K, +/− 1% |
| R32 | 51K | R33 | 1K, POT. CERMET |

FIGS. 6A and 6B

| | | | |
|---|---|---|---|
| IC 1 | TL 094 | IC 2 | ICM 7555 |
| IC 3 | ML 924 | IC 4 | 4050 |
| IC 5, IC 6 | 4051 | IC 9 | 4098B |
| IC 7 | SL 490 | IC 8 | 7407 |
| C1 | 0.01 | C2 | 47 |
| C3-5 | 0.001, +/− 1% | C6,7 | 20 pF |
| C8 | 22 | C9 | 4.7 |
| C10 | 0.01 | C11 | 33 |
| C12 | 4.7 | C13 | 0.1 |
| DMOS 1 | Supertex VN1206N5 | D2 | CQX-19 |
| D4 | HP 5082-4480 | Q1 | 2N3906 |
| R1 | 5.1 M | R2,3 | 10K |
| R4 | 47K | R5 | 1K, POT. CERMET |
| R6 | 5.1 M | R7 | 10K |
| R8 | 24K | R9 | 500K, POT. CERMET |
| R10-16 | 56K | R17 | 1K |
| R18 | 450 | R19 | 2K |
| R20 | 43K | R21 | 68K |
| R22 | 100K | R23-30 | 2K |

While only a single preferred embodiment of the inventive system have been shown and described, it is not intended to be limited thereby, but only by the scope of the claims which follow.

I claim:

1. A data telemetry system for process control comprising:
   a plurality of point transponders for receiving digitally coded interrogation signals, each of said transponders including a first group of PIN diodes disposed thereon for omnidirectionally detecting said interrogation signals and a second group of IR emitting diodes disposed thereon for generating digitally coded signals responsive to said interrogation signals;
   said first group and said second group defining a first array of diode nodes, each of said first array nodes being mounted upon a generally planar surface and including at least one diode of said first group and at least one diode of said second group;
   each of said point transponders further including an element defined by at least three planar surfaces arranged in a polyhedran configuration, said element having a dome disposed thereover for protecting said element, wherein said dome is configured of a material to act as an optical band pass filter;
   a transceiver including a generally hemispherical reflective member having a third group of IR emitting diodes disposed thereon for generating said interrogation signals and a fourth group of PIN diodes disposed thereon for receiving said responsive signals;
   said third group and said fourth group defining a second array of diode nodes, each of said second array nodes including at least one diode of said third group and at least one diode of said fourth group;
   each of said IR emitting diodes including a dedicated driver physically closely coupled thereto, each of said drivers comprising an integrated circuit of the MOSFET type and being powered by a pulse position modulator.

2. A data telemetry system for use in controlling heating, ventilating and air conditioning apparatus, said system including:
   a point transponder for receiving digitally coded interrogation signals formed of diffuse infrared light reflected from at least one surface intermediate said transponder and a transceiver, said transponder including a body member and a head member positionably attached to said body member;
   said head member including a transmitter module and a receiver module, said body member including means for modulating a signal to be directed to said transmitter module and means for demodulating an infrared light signal received at said receiver module;
   said point transponder further including an element defined by at least three planar surfaces arranged in a polyhedran configuration, said element having a dome disposed thereover for protecting said element, wherein said dome is configured of a material to act as an optical band pass filter;
   a transceiver for connection to a local control unit, said transceiver including a satellite having a face member and a reflective member attached to said face member, said face member being mountable to a surface within a room;
   said reflective member having a group of IR emitting diodes disposed thereon for generating said interrogation signals, said diode group and said reflective member cooperating for radiating said interrogation signals in a generally hemispherical pattern bounded by said mounting surface;
   said point transponder including a group of IR emitting diodes, each of said IR emitting diodes including a dedicated driver closely coupled thereto, each of said drivers comprising an integrated circuit of the MOSFET type and being powered by a pulse position modulator.

* * * * *